United States Patent Office 3,517,002
Patented June 23, 1970

3,517,002
POLYISOCYANATES CONTAINING ISOCYANURATE GROUPS
Herbert L. Heiss, New Martinsville, Va., assignor to Mobay Chemical Company, Pittsburgh, Pa., a corporation of Delaware
No Drawing. Filed Nov. 17, 1966, Ser. No. 595,046
Int. Cl. C07d 55/38
U.S. Cl. 260—248          3 Claims

ABSTRACT OF THE DISCLOSURE

Novel isocyanurate compositions are prepared by polymerizing a mixture of tolylene diisocyanate and hexahydrotolylene diisocyanate. The isocyanurate compositions are particularly useful in the preparation of urethane coatings.

---

This invention relates to polyisocyanate containing isocyanurate groups and more particularly to light stable polyisocyanates.

It has been heretofore known to prepare polyisocyanates containing isocyanurate groups by reacting polyisocyanates such as, for example, tolylene diisocyanate, hexamethylene diisocyanate and the like, in the presence of catalysts which cause trimerization of the NCO groups resulting in the formation of isocyanurates. These isocyanurate containing polyisocyanates find application in the production of polyurethane plastics such as solid elastomers and in coatings. They are particularly applicable in coatings because of their low volatility and hence their nontoxic nature. The isocyanurate-polyisocyanates heretofore known generally yield polyurethanes having good physical properties, such as, chemical resistance, temperature resistance, solvent resistance and the like, however, they have a tendency to yellow upon aging.

It is therefore an object of this invention to provide improved isocyanurate containing polyisocyanates. It is another object of this invention to provide isocyanurate containing polyisocyanates which when reacted with active hydrogen compounds yield polyurethanes which are substantially nonyellowing. It is another object of this invention to provide coatings having good physical properties and flexibility.

The foregoing objects and others which will become apparent from the following description are accomplished in accordance with the invention generally speaking by providing as a new composition of matter polyisocyanates having the general formula

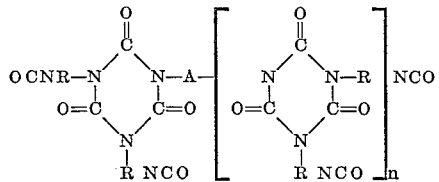

wherein A is

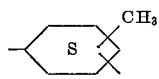

and R is

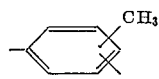

and $n$ is 0 to 1. Generally, A is

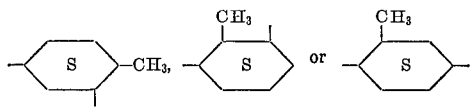

and R is

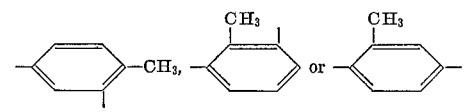

The composition in accordance with the invention is prepared by polymerizing a mixture of tolylene diisocyanate and hexahydrotolylene diisocyanate in the presence of tributyl phosphine as a catalyst. The ratio of two starting isocyanates can vary widely without altering the value of $n$ from within the limits of 0 to 1, for example, the ratio of tolylene diisocyanate to hexahydrotolylene diisocyanate can vary from 4:1 to 1:4. The isocyanurate structure will generally contain one or two isocyanurate rings linked together by the residue remaining after removal of two NCO groups from the cycloaliphatic isocyanate employed in the manufacture thereof. Thus, the composition in accordance with the invention will have the structure

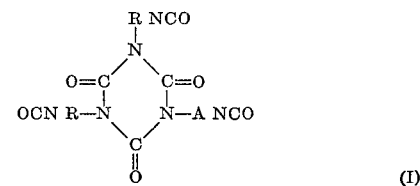

(I)

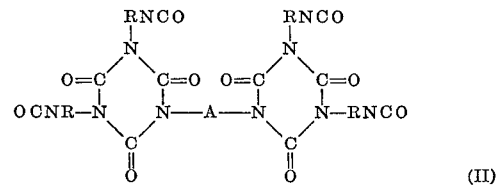

(II)

or mixtures of the above, wherein R and A are defined as above. The proportions of the compounds represented by Formulas I and II can vary from 100% I to 100% II. A specific mixture found to be useful in urethane coatings contains about 4 parts I to one part of II by weight. However, the ratio of I to II will vary depending upon the ratio of starting components.

The various isomers or mixtures thereof of the tolylene diisocyanate and hexahydrotolylene diisocyanate are used in the preparation of the isocyanurate polyisocyanates. For example, 2,4-tolylene diisocyanate and 2,4-hexahydrotolylene diisocyanate can be employed or isomeric mixtures of 2,4- and 2,6-tolylene diisocyanate and 2,4- and 2,6-hexahydrotolylene diisocyanate can be used. These various isomers are available in ratios of 80% 2,4- and 20% 2,6- and also, 65% 2,4- and 35% 2,6. Preferably, the 80%/20% isomeric mixtures are employed because of their availability.

The invention is further illustrated by the following examples in which parts are by weight unless otherwise specified.

EXAMPLE 1

Preparation of hexahydrotolylene diisocyanate

About 300 parts of 2,4-tolylene diamine together with 10 parts of ruthenium dioxide as a catalyst and 1200 ml. of dioxane are charged to a stainless steel autoclave which is then closed and purged with hydrogen gas until all oxygen has been removed. The temperature is then raised to 140° C. and stirred and then pressurized with hydrogen to 3500–4000 p.s.i.g. for a period of 5 hours and a temperature of about 140° C. After about 5 hours, the absorption of hydrogen has practically stopped. The autoclave is cooled to approximately 80° C. and the materials are discharged therefrom and distilled to recover the product. The catalyst is removed by centrifuging. To about 128 parts of hexahydrotolylene diamine obtained as immediately above are added 1100 parts of monochlorobenzene as a solvent. The solution is stirred and saturated with carbon dioxide at a temperature of from about 90–95° C. After the saturation is complete, as indicated by no further $CO_2$ absorption, the resulting saturation is stirred approximately six hours at 90–95° C. This mixture is then cooled to a temperature of 0° C. and about 360 parts of gaseous phosgene are introduced. During the phosgene addition, the temperature is not permitted to raise above 0° C. The solution is then gradually heated to 160° C. and phosgenated until a clear solution results. At this time, the phosgene is removed by passing nitrogen gas through the reactants for about thirty minutes. The resulting product is fractionated to obtain hexahydrotolylene diisocyanate.

EXAMPLE 2

Preparation of isocyanurate polyisocyanate

Into a three-necked flask equipped with thermometer and stirrer is charged about 1037 parts of the hexahydrotolylene diisocyanate prepared in Example 1, about 426 parts of 2,4-tolylene diisocyanate and about 450 microparts by volume of tributyl phosphine. The mixture is cooled as necessary to maintain the exothermic reaction mixture at 60° C. for three hours. The reaction is stopped when the refractive index and the mixture indicates that the reaction has reached the desired degree of completion. About 400 microparts by volume of a mixture of dimethyl sulfate and methyl-p-toluene sulfonate in a ratio of about 1.4/1 are added to stop the catalytic reaction. The refractive index of the mixture is about 1.522 at 20° C. The mixture is vacuum distilled at less than one mm. pressure to remove free monomer. A total of about 900 parts of unreacted monomer is recovered of which about 850 parts are hexahydrotolylene diisocyanate and about 50 parts are tolylene diisocyanate. The residue remaining is cooled and then ground and added to a sufficient quantity of anhydrous butyl acetate to make a solution containing 67% solids. This liquid has a viscosity of 5,700 centipoises at 20° C. and an NCO content of about 15% as determined by wet analysis using dibutyl amine.

EXAMPLE 3

Preparation of a clear urethane varnish for coating wood and other substrates About 563 parts of an hydroxyl polyester having an hydroxyl number of about 210 and prepared by reacting 3 mols of adipic acid with two mols of hexanetriol and two mols of butane diol are mixed with about 452 parts of ethylene glycol monoethylether acetate and about 333 parts of toluene. About 1000 parts of this mixture is mixed with about 484 parts of the isocyanurate polyisocyanate prepared in accordance with Example 2. The NCO to OH ratio of this mixture is about 1.1 and contains a nonvolatile content of about 50%. The resulting coating composition is applied to wood and forms a nonyellowing, water, solvent, chemical and abrasion resistant hard flexible coating of long durability.

EXAMPLE 4

Preparation of a pigmented enamel for wood and metal

To about 56 parts of the polyester of Example 3 is added 49 parts of ethylene glycol monoethylether acetate, 24 parts of toluene and 42 parts of pigment grade titanium dioxide. To this mixture is added 65 parts of the isocyanurate polyisocyanate of Example 2. This results in an NCO/OH ratio of about 1.1 and has a nonvolatile solids content of about 60%. The coating is applied to both water and metal surfaces wherein it forms a hard white enamel of good flexibility which withstands weathering without substantial yellowing and exhibits high resistance to abrasion, chemicals, solvents and water.

In the preparation of coating compositions any suitable active hydrogen containing compound such as those set forth in U.S. Pat. No. 3,232,908 may be used in place of the particular polyesters set forth in the examples.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A polyisocyanate of the formula:

$$\begin{array}{c} RNCO \\ | \\ N \\ O=C \diagup \diagdown C=O \\ | \quad\quad | \\ OCNR-N \quad\quad N-ANCO \\ \diagdown C \diagup \\ \| \\ O \end{array}$$

wherein R is

[structure: cyclohexyl with CH₃ substituent]

and A is

[structure: phenyl with S and CH₃ substituents]

2. A polyisocyanate of claim 1 wherein R is

[structures: —⟨phenyl⟩—CH₃, —⟨phenyl with CH₃⟩—, or —⟨phenyl with CH₃⟩—]

3. A polyisocyanate of claim 1 wherein A is

[structures: —⟨S-phenyl⟩—CH₃, —⟨S-phenyl with CH₃⟩—, or —⟨S-phenyl with CH₃⟩—]

References Cited

UNITED STATES PATENTS

| | | | |
|---|---|---|---|
| 3,341,463 | 9/1967 | Gemeinhardt | 252—182 |
| 3,211,585 | 10/1965 | Meyer et al. | 260—248 XR |
| 3,330,828 | 7/1967 | Grogler et al. | 260—248 |
| 3,367,934 | 2/1968 | Tate et al. | 260—248 |

HENRY R. JILES, Primary Examiner

J. M. FORD, Assistant Examiner

U.S. Cl. X.R.

117—161, 132; 252—182; 260—77.5